United States Patent
Nishide et al.

(10) Patent No.: US 7,463,383 B2
(45) Date of Patent: Dec. 9, 2008

(54) IMAGE PROCESSING METHOD AND IMAGE PROCESSING DEVICE

(75) Inventors: Yasushi Nishide, Ebina (JP); Takanori Okuoka, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 773 days.

(21) Appl. No.: 11/013,413

(22) Filed: Dec. 17, 2004

(65) Prior Publication Data

US 2005/0134881 A1  Jun. 23, 2005

(30) Foreign Application Priority Data

Dec. 22, 2003  (JP)  ............................. 2003-424826

(51) Int. Cl.
| | |
|---|---|
| G06F 15/00 | (2006.01) |
| G03F 3/08 | (2006.01) |
| H04N 1/46 | (2006.01) |
| G09G 5/02 | (2006.01) |
| B41J 2/21 | (2006.01) |
| G06K 9/00 | (2006.01) |

(52) U.S. Cl. .................. 358/1.9; 358/501; 358/518; 358/523; 358/2.1; 345/592; 347/43; 382/162; 382/167

(58) Field of Classification Search .................. 358/1.9, 358/518, 1.16, 2.1, 523, 1.1, 1.8, 501, 534, 358/526; 345/592, 431, 150, 153, 154; 347/16, 347/14, 43, 23, 15, 176, 175, 187; 707/4, 707/104.1, 5; 715/210, 234, 259; 382/162, 382/167; 709/201

See application file for complete search history.

(56) References Cited

U.S. PATENT DOCUMENTS

| | | | | | |
|---|---|---|---|---|---|
| 5,499,366 | A | * | 3/1996 | Rosenberg et al. | 707/4 |
| 6,002,416 | A | * | 12/1999 | Gerber | 347/176 |
| 6,058,207 | A | * | 5/2000 | Tuijn et al. | 382/162 |
| 6,290,318 | B1 | * | 9/2001 | Yasukawa | 347/16 |
| 6,297,826 | B1 | * | 10/2001 | Semba et al. | 345/589 |
| 6,351,320 | B1 | * | 2/2002 | Shin | 358/1.9 |
| 6,954,286 | B1 | * | 10/2005 | Muramoto | 358/1.9 |
| 7,085,006 | B2 | * | 8/2006 | Yokoyama et al. | 358/1.9 |
| 7,088,469 | B1 | * | 8/2006 | Sanger et al. | 358/1.9 |
| 2003/0197749 | A1 | * | 10/2003 | Kawakami | 347/15 |
| 2004/0113919 | A1 | * | 6/2004 | Hawksworth | 345/592 |
| 2004/0215706 | A1 | * | 10/2004 | Lavender et al. | 709/201 |

FOREIGN PATENT DOCUMENTS

| | | |
|---|---|---|
| JP | A 2000-062253 | 2/2000 |
| JP | A 2003-348366 | 12/2003 |

* cited by examiner

*Primary Examiner*—Edward L Coles
*Assistant Examiner*—Charlotte M Baker
(74) *Attorney, Agent, or Firm*—Oliff & Berridge, PLC

(57) ABSTRACT

The present invention provides an image processing method and image processing device for performing image processing, based on image data and/or drawing instructions, on a page layout which employs process colors inputted from an image processing terminal. The image processing method includes: (a) specifying a color substitution of one of the process colors for the image data and/or drawing instructions; (b) instructing addition of a paper color, including color information, to the whole area of the page layout; and (c) performing the color substitution by adding the color information of the paper color to color information of a substitution color which is being substituted for the process color specified by the color substitution.

8 Claims, 8 Drawing Sheets

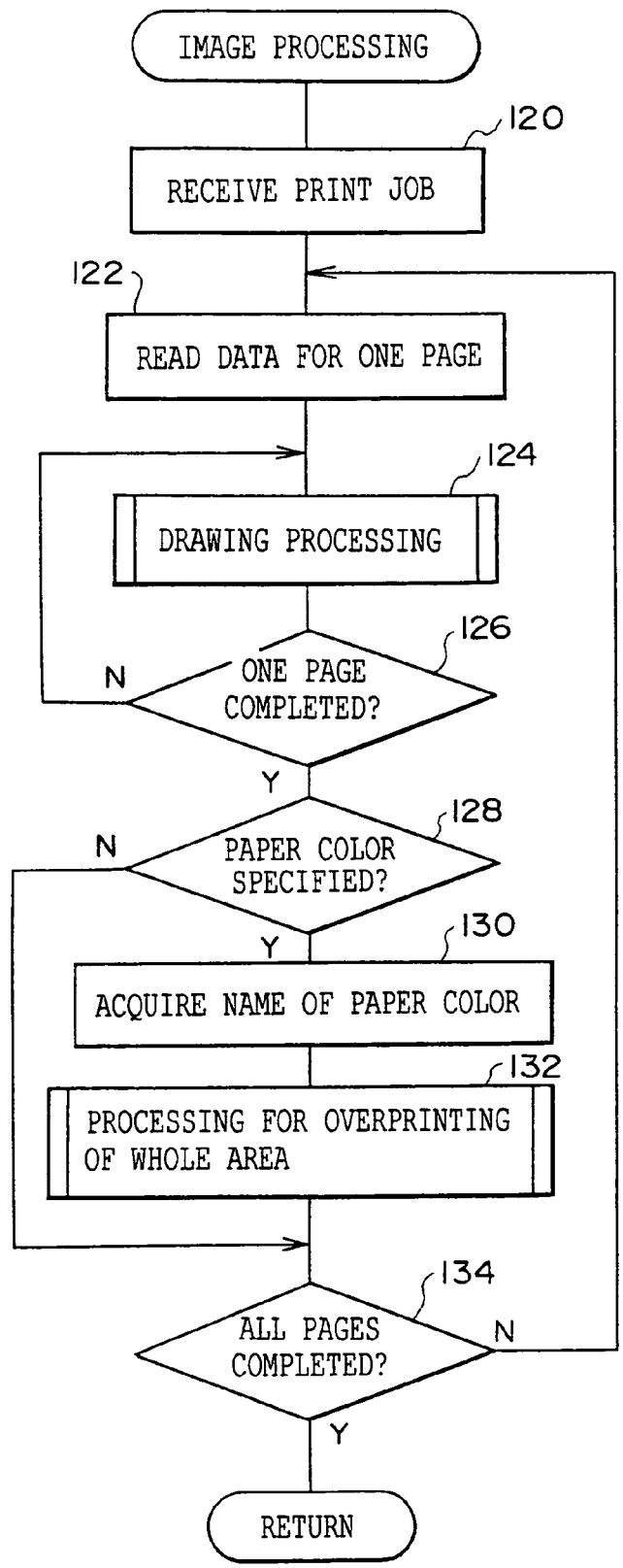

IMAGE PROCESSING METHOD AND IMAGE PROCESSING DEVICE

CROSS-REFERENCE TO RELATED APPLICATION

This application claims priority under 35 USC 119 from Japanese Patent Application No. 2003-424826, the disclosure of which is incorporated by reference herein.

BACKGROUND OF THE INVENTION

1. Field of the Invention

The present invention relates to an image processing method and image processing device for carrying out image processing on the basis of image data and drawing instructions.

2. Description of the Related Art

Desktop publishing (DTP) creates a page layout by implementation of image creation, processing, editing, etc. on a processing device such as a personal computer, a workstation or the like. On the basis of this page layout, a film for exposure of a printing plate is created (CEPS), the printing plate is directly written therefrom, and a plate for production printing is created (CTP: Computer-To-Plate)).

In DTP, when proofreading is to be carried out before actually creating a printing plate or production printing using a printing plate, WYSIWYG functions may be utilized to print out a page layout that is displayed on a monitor from a color printing device, such as a laser printer or the like.

In usual color printing, four colors are employed as process colors: cyan (C), magenta (M), yellow (Y) and black (K). Printing is sometimes implemented by using a single color selected from the process colors (single-color printing), or two of the process colors (two-color printing) or three of the process colors (three-color printing). Further, printing that employs a "spot colors" in place of a process color is sometimes implemented. Further still, with a view to lowering printing costs and the like, two-color printing is sometimes implemented using, for example, two spot colors or one spot color and one process color.

Generally, in a DTP application, color mixing of process colors is simple. However, when printout data (a page layout) is to be created for two-color printing, in many applications it is not possible to instruct color-mixing of spot colors. Accordingly, when a DTP application is used to create a page layout for two-color printing using (a) spot color(s), it is common for the page layout to be created and printed on film using two process colors.

However, if a process color is used instead of a spot color when a page layout is created for two-color printing using spot colors, when a laser printer or the like is to be employed to print out this page layout for comprehension or proofing, the page layout is printed by two-color printing using process colors. Thus, it is difficult to obtain an accurate printing simulation of how the final printed matter will appear.

Accordingly, a method has been proposed in which a special profile is created beforehand and it is possible to simulate two-color printing using spot colors with this profile.

Meanwhile, in printing using actual printing inks (printing of a final product), color of a paper may differ from when a printing simulation was performed. As a result, printed matter obtained in the printing simulation and the actual product of printing may differ in their finished appearances.

That is, it is often the case that paper with a color close to white is used in a printing simulation, but the paper used in actual printing may have various colors and the final product is often printed on paper with a color other than white.

Therefore, when two-color printing or three-color printing is to be implemented, a printing simulation must include the color of the paper that will be used when the final product is obtained.

When full-color printing is to be implemented, a paper color can be simulated by color correction. However, in two-color printing and the like, particularly when a spot color is included, it is difficult to simulate a paper color by color correction.

Accordingly, methods of using special profiles which are matched to paper colors have been considered. However, in such a case, each time the color of paper changes, it is necessary to create a profile to suit the new paper color. Resultantly, great volumes of work, time and expense are incurred. Furthermore, when a method of performing a simulation of two-color printing or the like simply from the name of a spot color is employed, it is necessary to create a special CMYK profile to match the color of a paper.

SUMMARY OF THE INVENTION

The present invention has been made in view of the above circumstances and provides an image processing method and an image processing device.

The present invention is an image processing method for performing image processing, based on at least one of image data and drawing instructions, on a page layout which employs process colors inputted from an image processing terminal, the image processing method including: (a) specifying a color substitution of at least one of the process; (b) instructing addition of a paper color, including color information, to a whole area of the page layout; and (c) adding the color information of the paper color to color information of a substitution color which is being substituted for the process color specified by the color substitution.

According to this invention, when a color substitution and addition of a paper color are assigned, color information of the paper color is added to the substitution color, and the color substitution is implemented.

Consequently, it is possible to easily perform image processing in which printing simulations in which paper colors are applied are possible.

The present invention is an image processing method for performing image processing, based on at least one of image data and drawing instructions, on a page layout which employs process colors inputted from an image processing terminal, the image processing method including: (a) specifying non-printing of at least one of the process colors; (b) instructing addition of a paper color, including color information, to a whole area of the page layout; and (c) performing a color substitution of the paper color for the process color for which non-printing has been specified, for drawing the paper color.

According to this invention, when there is a process color which is assigned not to be printed out, a color plate for the paper color is created using that process color. That is, when there is a process color for which printing is not assigned, printing out is performed with a plate of that color substituted with the paper color.

Consequently, it is possible to easily perform image processing such that printing simulations with paper colors are possible, even when color substitutions with spot colors and the like are assigned.

The present invention is an image processing method for performing image processing, based on at least one of image data and drawing instructions, on a page layout which employs process colors inputted from an image processing terminal, the image processing method including: (a) instructing addition of a paper color, including color information, to a whole area of the page layout; and (b) drawing the paper color over the whole area of the page layout by overprinting of a spot color based on the color information.

According to this invention, an object of the paper color is specified to cover the whole of the page layout, and this object is rendered by overprinting. Therefore, it is possible to perform image processing in which printing simulations with paper colors are possible even if there are no process colors for which color substitution or non-printing is specified.

The present invention is an image processing device for performing image processing, based on at least one of image data and drawing instructions, on a page layout which employs process colors inputted from an image processing terminal, the image processing device including: a specification component which specifies a color substitution of at least one of the process colors; an instruction component which instructs addition of a paper color, including color information, to a whole area of the page layout; and a color substitution component which adds the color information of the paper color to color information of a substitution color which is being substituted for the process color specified by the color substitution, for performing the color substitution.

The present invention is an image processing device for performing image processing, based on at least one of image data and drawing instructions, on a page layout which employs process colors inputted from an image processing terminal, the image processing device including: a specification component which specifies non-printing of at least one of the process colors; an instruction component which instructs addition of a paper color, including color information, to a whole area of the page layout; and a drawing component which performs a color substitution of the paper color for the process color for which non-printing has been specified, for drawing the paper color.

The present invention is an image processing device for performing image processing, based on at least one of image data and drawing instructions, on a page layout which employs process colors inputted from an image processing terminal, the image processing device including: an instruction component which instructs addition of a paper color, including color information, to a whole area of the page layout; and a drawing component which draws the paper color over the whole area of the page layout by overprinting of a spot color based on the color information.

BRIEF DESCRIPTION OF THE DRAWINGS

Embodiments of the present invention will be described in detail based on the following figures, wherein:

FIG. 8 is a flowchart illustrating an example of paper color simulation utilizing an overprinting function.

DETAILED DESCRIPTION OF THE INVENTION

Figure 1:
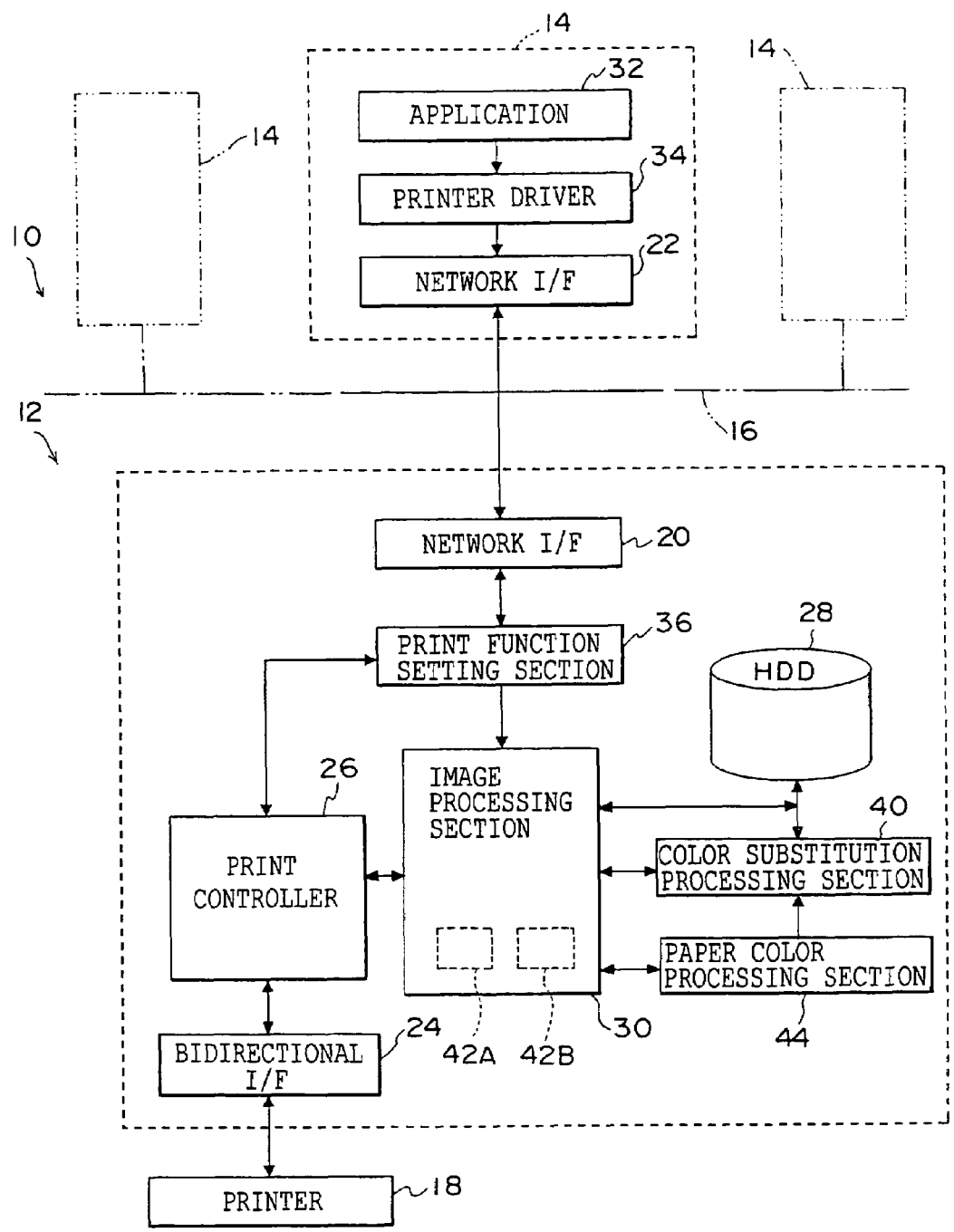
FIG. 1 is a schematic structural diagram of a network and a print server employed in an embodiment of the present invention.

Herebelow, an embodiment of the present invention will be described with reference to the drawings. FIG. 1 shows general structure of a network 10 with which the present embodiment is applied. In this network 10, a print server 12 and a plurality of client terminals 14 are network-connected by a communications circuit 16. The print server 12 is provided to serve as an image processing device with which the present invention is applied, and the client terminals 14 are provided to serve as image processing terminals.

A printer 18, to serve as a printing output device, is also connected to the print server 12. When the print server 12 receives a print job outputted from the client terminals 14, the print server 12 executes image processing and printing output in accordance with the print job.

The print server 12 will be described herebelow as an example of an image processing device. However, the image processing device of the present invention is not limited thus, and could be a device which is provided to perform image processing at any of various intermediate servers, such as a file server which is network-connected with the client terminals 14 or the like.

Network interfaces (network I/F) 20 and 22 are provided at the print server 12 and the client terminals 14. The print server 12 and the client terminals 14 are connected to the communications circuit 16 through these network interfaces 20 and 22.

The print server 12 is further provided with a bidirectional interface (bidirectional I/F) 24. The print server 12 is connected to the printer 18 through this bidirectional I/F 24. Herein, the print server 12 may be connected to a plurality of the printer 18.

The print server 12 described above may be structured by adding a PCI board equipped with predetermined functions to a personal computer (PC) or suchlike. Further, the print server 12 may be a device which is connected with an input device such as a keyboard, a mouse or the like and a display device such as a CRT display, a liquid crystal display or the like, and which is provided with WYSIWYG functions for processing images displayed at the display device and printing out the displayed images. Further yet, the print server 12 may be integrated with the printer 18 or be separate from the printer 18.

A print controller 26, an HDD (hard disk drive) 28 and an image processing section 30 are constituted at the print server 12. The print controller 26 controls operations of the printer 18 and of the print server 12 itself, and the HDD 28 stores various kinds of data. The image processing section 30 carries out RIP processing to create raster data on the basis of job data such as image data, drawing instructions and the like, which are inputted from the client terminals 14 in the form of jobs such as print jobs and the like (below referred to as print jobs). Herein, conventionally known ordinary structures can be employed for basic structures of the print server 12, and are not described in detail for the present embodiment.

A DTP application 32 (below referred to as "the application 32") is provided at the client terminal 14. The client terminal 14 uses this application 32 to perform image processing, document creation and the like, including creation, processing, editing and so forth of images, texts, etc. The application 32 enables the client terminal 14 to create print data (image data, drawing commands, etc.) for printing of page layouts and the like.

A printer driver (driver software) 34 is also provided at the client terminal 14. Using this printer driver 34, the client terminal 14 can output print data created by the application 32 to the print server 12 as a print job. At such a time, because the printer driver 34 is employed, it is possible to specify various printing functions and the like.

A print function setting section 36 is constituted at the print server 12. When the print server 12 receives a print job transmitted from the client terminals 14, setting of printing functions designated by the print job is implemented, and a printout corresponding to the print job is obtained in accordance with the printing functions that have been thus set.

A color substitution processing section 40 is constituted at the print server 12. A plurality of spot colors are specified at the print server 12 in advance, separately from the process colors cyan (C), magenta (M), yellow (Y) and black (K). CMYK values for each of these spot colors are tabulated and stored in the HDD 28.

When a color substitution of a spot color for one of the process colors is specified, the color substitution processing section 40 refers to a look-up table (LUT) of the above-mentioned CMYK values of the spot color stored in the HDD 28, sets the CMYK values, and implements an update of color information.

That is, in the color substitution processing section 40, color information with new CMYK values is generated by combining the CMYK values of the spot color with the CMYK values of colors other than the color whose substitution has been instructed.

Accordingly, at the print server 12, it is possible, for example, to create image data and/or text data for two-color printing using any two colors selected from the process colors, and to print out using a spot color(s) which differs from the process colors as one or both of the two colors. Thus, it is possible, using the spot color(s) which differ from the process colors, to perform a printing simulation of a print job that will implement printing-plate printing.

A CMYK printout region 42A and a CMYK correction region 42B are provided in, for example, a memory of the image processing section 30. When image processing is carried out on a print job for which a color substitution with a spot color has been assigned, the CMYK values of the assigned spot color are stored in the CMYK printout region 42A. Further, CMYK values of the process colors that are to be used for corresponding objects are stored in the CMYK correction region 42B.

When color information for a corresponding drawing object is to be created and printed out, the CMYK values stored in the CMYK printout region 42A and the CMYK values stored in the CMYK correction region 42B are combined.

In such a case, color correction can be applied to the CMYK values stored in the CMYK correction region 42B in advance. Thus, when a printing simulation is to be performed using a spot color and a process color(s), correction of the process color(s) for which substitution has not been instructed is possible.

A paper color processing section 44 is also provided in the print server 12. The print server 12 enables paper color simulations along with N-color printing simulations that use spot colors. A paper color simulation is a printing simulation which incorporates the color of a paper that is to be used at a time of actual printing with printing plates. With this paper color processing section 44, when a paper color simulation is instructed and a color substitution is to be implemented, color information of CMYK values to which the paper color has been added is created.

CMYK values of the paper color are specified in advance. Hence, a table (an LUT) of these CMYK values is stored in the HDD 28 provided at the print server 12.

At the client terminal 14, the printer driver 34 can be used to specify utilization of various printing functions which are provided at the print server 12 and at the printer 18 connected to the print server 12.

Thus, when image processing and printing processing are carried out on image data and/or drawing instructions created by the application 32 (i.e., a print job), it is possible to make use of the various printing functions provided at the print server 12 and printer 18 from the client terminal 14.

The print server 12 is provided with a function for N-color printing simulations and a function for substituting process colors with spot colors. It is possible to specify the use of spot colors in N-color printing simulations from the client terminal 14, by means of a user interface which applies settings to the printer driver 34.

Figure 2A:
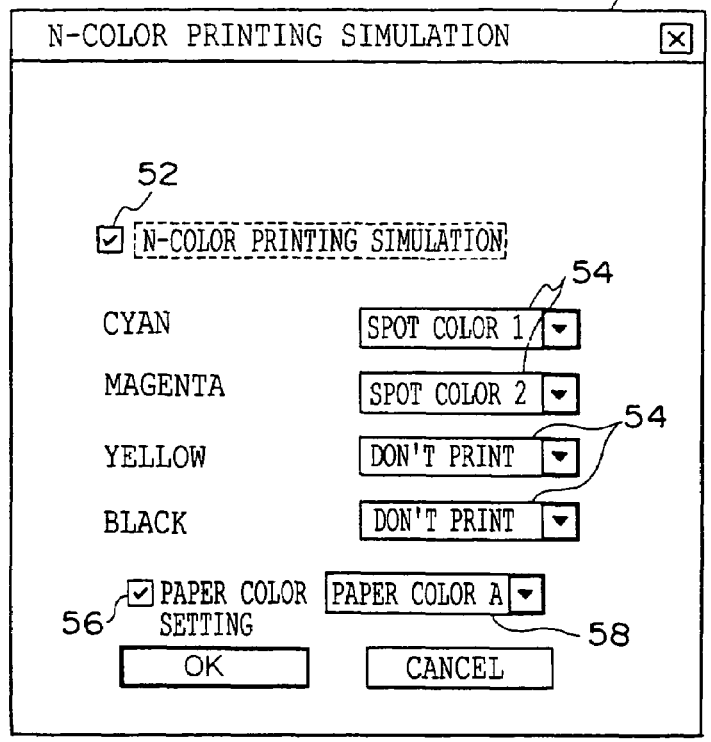
FIGS. 2A and 2B are schematic views of a settings dialog which is used as an example of a user interface for implementing settings of N-color printing simulations and paper color simulations from a client terminal.

FIG. 2A shows an example of an N-color printing simulation dialog 50 (below referred to as "the settings dialog 50"), which is an example of this user interface. In this settings dialog 50, a check box 52 is provided for choosing whether or not to perform an N-color printing simulation. When a check mark is put in this check box 52, N-color printing simulation is selected.

Input boxes 54, for each of the colors cyan, magenta, yellow and black, are also provided in this settings dialog 50. With the input boxes 54, it is possible, for example, to select "Print" or "Don't Print" from a pull-down menu. Thus, it is possible to specify N-color printing simulations from one to three colors.

Further, in the pull-down menus of the input boxes 54, together with the respective process color C, M, Y or K, the spot colors that have been specified for use at the print server 12, which is to say the spot colors for which the LUTs of CMYK values are stored in the HDD 28 of the print server 12, are displayed. Thus, it is possible to specify a color substitution of a process color with a spot color by selection of a displayed spot color.

Here, FIG. 2A shows an example of setting a two-color printing simulation in which cyan is substituted with "Spot Color 1" and magenta is substituted with "Spot Color 2".

Further, specification of a paper color simulation is possible with this settings dialog 50. When paper color simulation is to be selected in the settings dialog 50, a check box 56 is marked. Hence, input into an input box 58 is possible.

At this input box 58, pre-specified paper colors, which are stored in LUTs of CMYK values in the HDD 28 of the print server 12, are displayed by, for example, a pulldown menu, and the displayed paper colors can be selected.

Figure 2B:
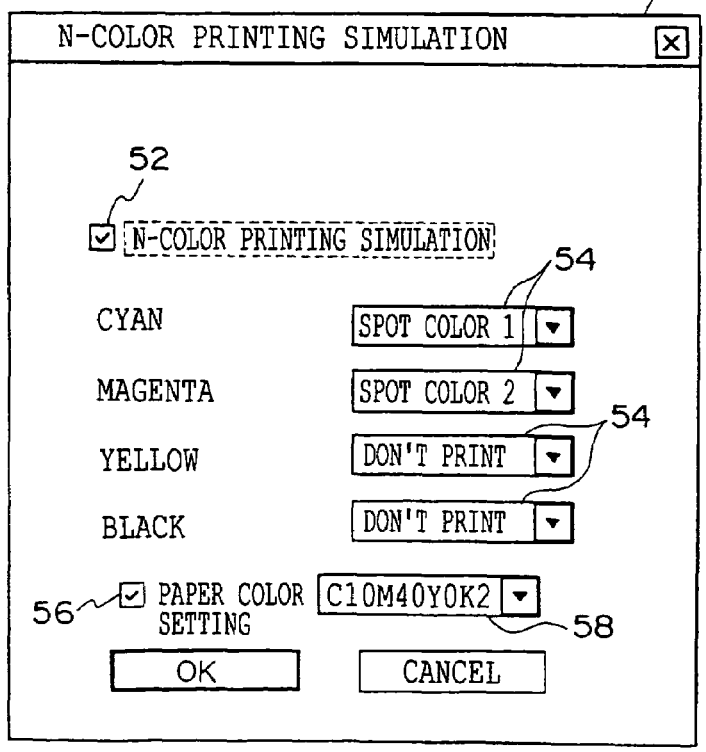

Here, as shown in FIG. 2B, the input box 58 may contain, for example, values which designate a paper color by inputted CMYK values instead of a previously registered paper color. FIG. 2B shows an example in which the CMYK values of a paper color are set to C=10, M=40, Y=0 and K=2.

Now, as operations of the present embodiment, an N-color printing simulation employing spot colors and a paper color simulation at the print server 12 will be described.

At this print server 12, it is possible to input CMYK values of a paper color at the client terminal 14. Basically however, tables of spot colors and tables of paper colors are stored at the HDD 28 in advance. First, input of CMYK values of a paper color will be described. With this print server 12, input of spot colors can be done in the same manner as for paper colors. Herebelow, input of paper colors and spot colors will be described together.

A user interface for inputting paper colors and spot colors is provided at the print server 12. Using this interface, it is possible to input paper colors and spot colors. It is also possible, by connecting a densitometer which measures color densities of paper colors, spot colors and the like to the print server 12, to input paper colors and spot colors with such a densitometer.

Figure 3:
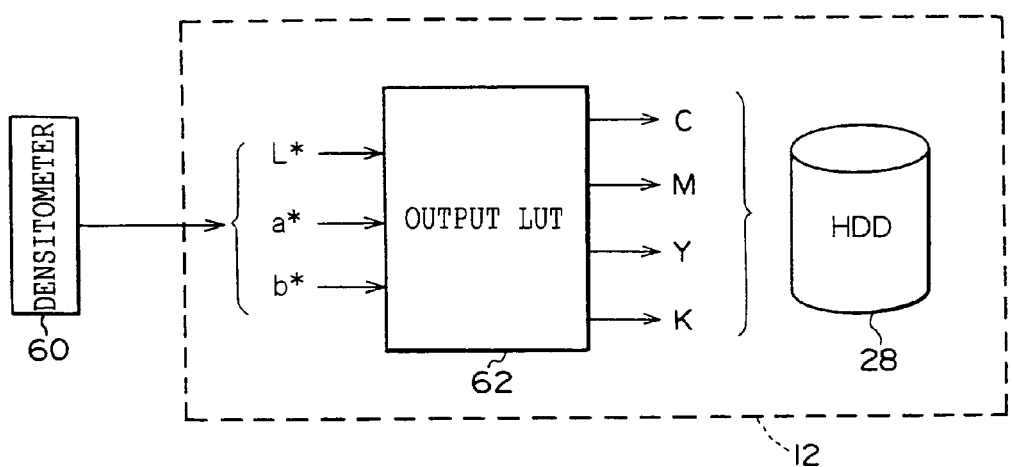
FIG. 3 is a schematic view illustrating conversion of L*a*b* values to CMYK values.

Many densitometers output L*a*b* values (below referred to as L*a*b* values) rather than CMYK values. Therefore, when CMYK values of a paper color or spot color are to be obtained using a densitometer 60, an output LUT (look-up table) 62 is provided at the print server 12, as shown in FIG. 3A.

A color conversion profile representing characteristics of the printer 18, such as an ICC profile or the like, is employed as this output LUT 62. With the paper for provision of the final results of printing or a sample of the spot color serving as a target, color densities of this measurement subject are measured by the densitometer 60, color values are outputted, L*a*b* values are obtained from the outputted color values, and these L*a*b* values can be converted to CMYK values with the output LUT 62.

FIGS. 4A to 4C and FIGS. 5A and 5B show an example of a user interface which is used for input of paper colors and spot colors. At the print server 12, it is possible to create a table of a paper color or a spot color (a color table) by, for example, a wizard procedure for calibration or the like.

Figure 4A:
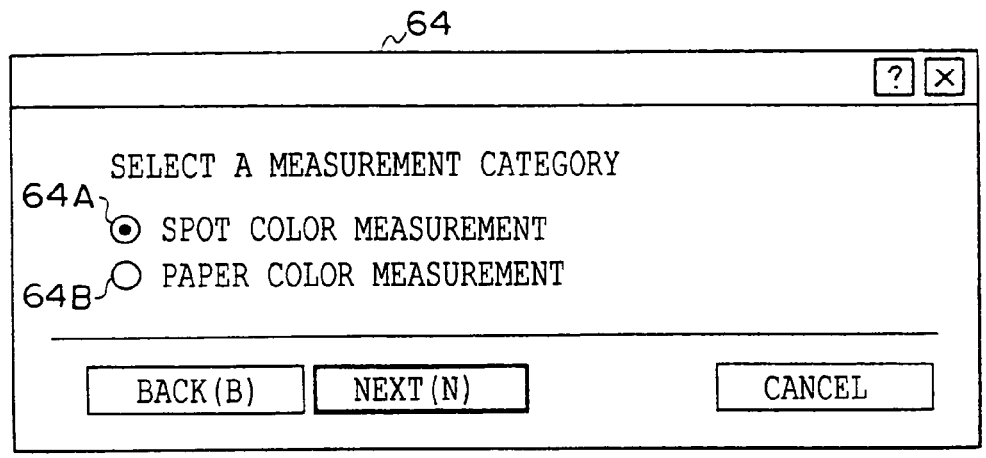
FIGS. 4A to 4C are schematic views showing dialogs which are used in an example of a user interface at a time of specifying a paper color or a spot color by a wizard process.

FIG. 4A shows a dialog 64 which is initially displayed on a monitor when table creation is selected at the print server 12. In this dialog 64, creation of a spot color table (spot color assignment) or creation of a paper color table (paper color assignment) is selected by a radio button 64A or a radio button 64B.

Figure 4B:
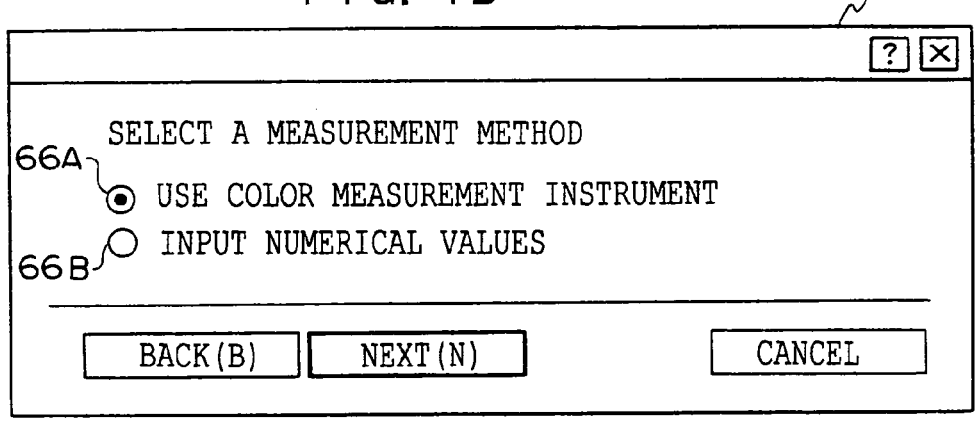

FIG. 4B shows a dialog 66 which is displayed after the dialog 64. In this dialog 66, it is possible, with radio buttons 66A and 66B, to choose whether to use a color measurement instrument (the densitometer 60) or to input numerical values.

Figure 4C:
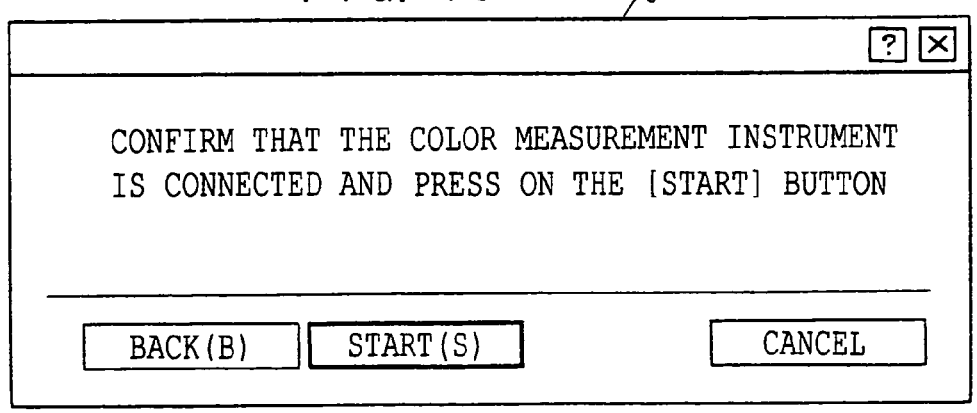

Here, the radio button 66A is marked, and input using the densitometer 60 (a color measurement instrument) is selected. Hence, a dialog 68 as shown in FIG. 4C is displayed and density measurement is enabled.

Figure 5A:
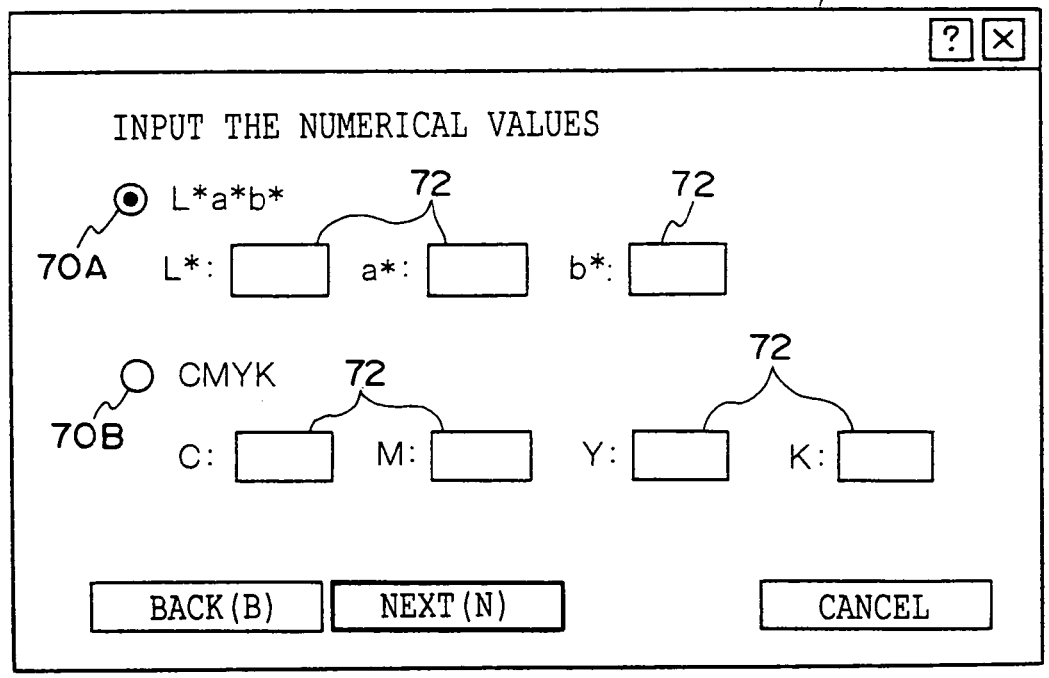
FIGS. 5A and 5B are schematic views showing dialogs which are used with FIGS. 4A to 4C.

On the other hand, if the radio button 66B is marked in the dialog 66 and input of numerical values is selected, an input dialog 70 as shown in FIG. 5A is displayed. In this input dialog 70, it is possible to select whether L*a*b* values or CMYK values are to be input, by radio buttons 70A and 70B. One of these is selected and numerical values are inputted into input boxes 72. Hence, the inputted numerical values are read in.

Note that L*a*b* values are inputted when the densitometer 60 is used, of course, and when the radio button 70A is marked in the input dialog 70. At such times, conversion to CMYK values is implemented by the output LUT 62.

Figure 5B:
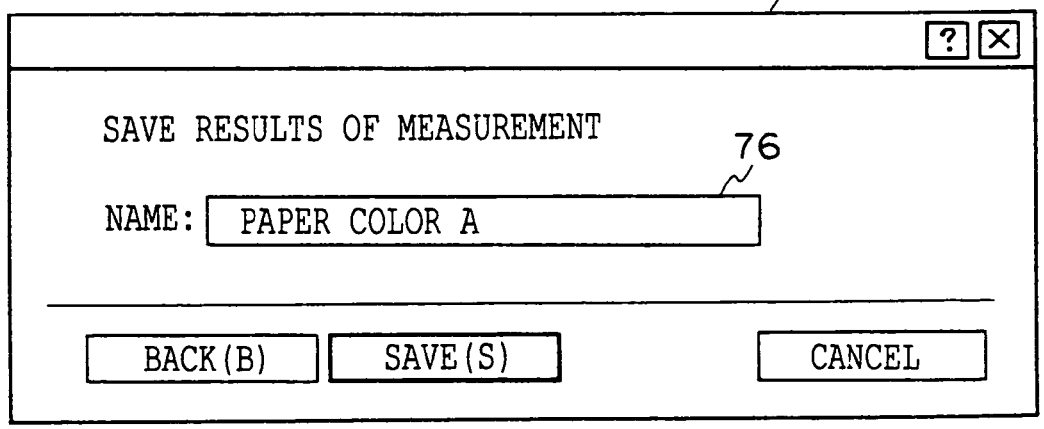

When such input has been completed, a save dialog 74 shown in FIG. 5B is displayed. A name is inputted into an input box 76, after which a table of the paper color or spot color is saved to the HDD 28 under the inputted name.

When the settings dialog 50 (see FIG. 2A) is displayed at the client terminal 14, paper colors and spot colors corresponding to tables that have been saved in this manner can be displayed in the pull-down menus at the input boxes 54 and the input box 58.

Hence, at the print server 12, N-color printing simulations are performed using spot colors based on these spot color tables and paper color simulations are performed in accordance with the paper color tables.

If paper color simulation is specified when an N-color printing simulation with a spot color is to be performed, the table of the spot color and the table of the paper color (i.e., CMYK values thereof) are utilized by the print server 12 to add the CMYK values of the paper color to the spot color table. Thus, a table for printing the spot color on the designated paper color is created.

For example, a table of Spot Color 1 is shown in Table 1.

TABLE 1

| | Spot color 1 | | | |
|---|---|---|---|---|
| Density | C | M | Y | K |
| 0 | 0 | 0 | 0 | 0 |
| 1 | 4 | 0 | 4 | 0 |
| 2 | 8 | 0 | 8 | 0 |
| . | . | . | . | . |
| . | . | . | . | . |
| . | . | . | . | . |
| 255 | 255 | 0 | 255 | 0 |

If, in such a case, the CMYK values of a Paper Color A are C=10, M=40, Y=0 and K=2, a table is created for Spot Color 1 when Spot Color 1 is to be production-printed on Paper Color A. This table is, based on Table 1 and the CMYK values of Paper Color A, the table shown in Table 2.

TABLE 2

| | Spot color 1 + Paper Color A | | | |
|---|---|---|---|---|
| Density | C | M | Y | K |
| 0 | 10 | 40 | 0 | 2 |
| 1 | 14 | 40 | 4 | 2 |
| 2 | 18 | 40 | 8 | 2 |
| . | . | . | . | . |
| . | . | . | . | . |
| . | . | . | . | . |
| 255 | 255 | 40 | 255 | 2 |

The print server 12 implements an N-color printing simulation featuring Paper Color A by using the table of Table 2 hereabove for performing a color substitution of Spot Color 1.

Note that if two or more spot colors are to be used, a table in which the paper color is added is created only for one or another of the spot colors. Accordingly, an increase in density of the paper color beyond the actual paper color density can be avoided.

Further, when no spot color is to be employed, new color information in which the CMYK values of a paper color are added to a plate of any one of the colors C, M, Y and K may be created.

Figure 6:
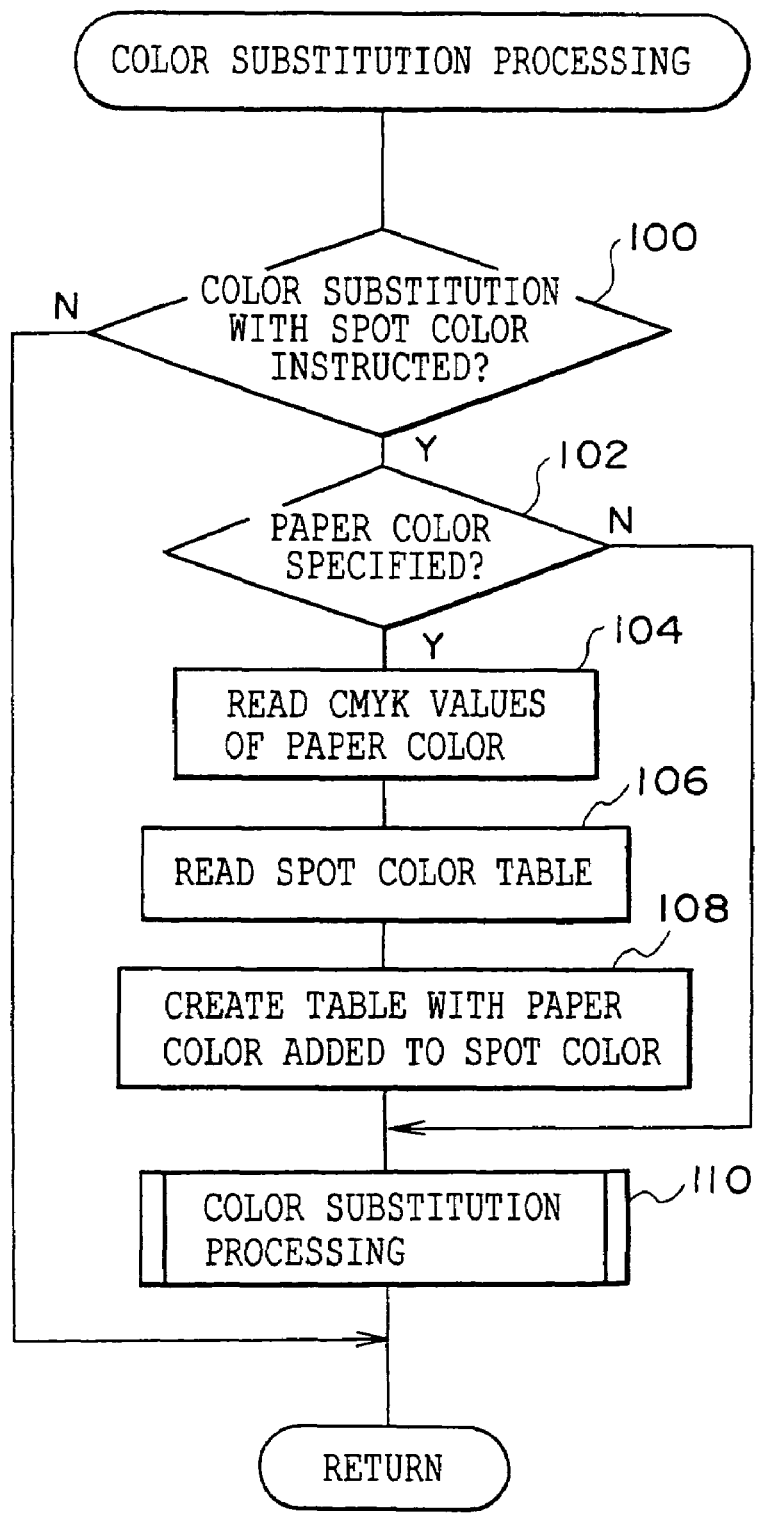
FIG. 6 is a schematic flowchart of processing, which illustrates an example of color substitution using a spot color and paper color simulation.

FIG. 6 shows a processing flow in the print server 12 at such a time. In a first step 100 of this flowchart, it is ascertained whether or not a color substitution of a spot color for any of the process colors has been instructed. If a color substitution with a spot color has been specified, the judgement of step 100 is positive and, in step 102, it is ascertained whether or not a paper color has been specified.

Here, if there is a paper color setting, the judgement of step 102 is positive and the process advances to step 104. In step 104, the CMYK values for the specified paper color are read, and in step 106, a table corresponding to one of the spot color(s) for which substitution has been instructed is read.

Thereafter, in step 108, a spot color table that is to be used for the color substitution is created by adding the CMYK values of the paper color to the table of the spot color. The process advances to step 110, and the color substitution with this spot color is executed. Note that if a color substitution with a spot color is not instructed, this flowchart simply ends and usual image processing is executed.

Thus, it is possible to create color information that includes a paper color and perform printing processing with ease.

Here, a freely selected process can be employed for the substitution processing which is executed in step 110. For example, a two-color printing simulation could be specified that employs, of the process colors C, M, Y and K, a C plate and an M plate and in which the C plate is substituted with Spot Color 1 and the M plate is substituted with Spot Color 2. For this simulation, new color information may be generated by using image data of the C plate and the table of Spot Color 1 to generate information of each color C, M, Y and K for forming the C plate with Spot Color 1, using image data of the M plate and the table of Spot Color 2 to generate information of each color C, M, Y and K for forming the M plate with Spot Color 2, and adding these sets of color information together.

Spot colors are sometimes inputted as CMYK values. In such a case, it is necessary to perform color correction for the spot color in the same manner as for the usual process colors. Here, it is preferable to add the CMYK values of a paper color to the CMYK values of the spot color after the color correction has been applied.

Figure 7:
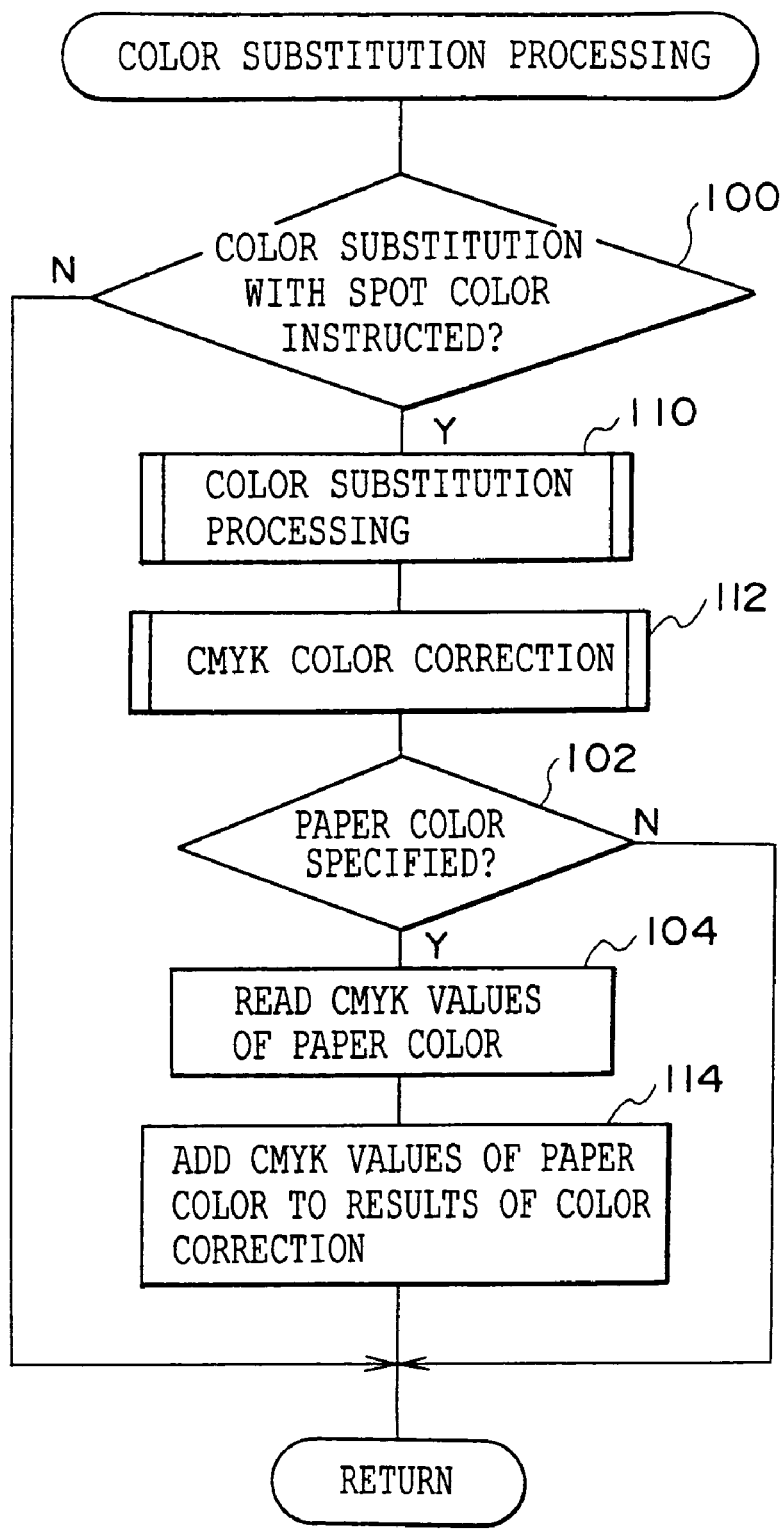
FIG. 7 is a schematic flowchart of processing, which illustrates another example of color substitution using a spot color and paper color simulation.

In other words, in such a case, as shown in FIG. 7, when a color substitution with a spot color is instructed and the judgement in step 100 is positive, the process advances to step 110. The color substitution processing is executed to create new color information (CMYK values) and, in next step 112, color correction is applied to the thus-generated CMYK values.

When the color correction has finished, the process advances to step 102 and ascertains whether a paper color has been specified. If there is a paper color setting, the judgement of step 102 is positive, the process advances to step 104, and the CMYK values of the paper color are read in.

In a subsequent step 114, the color information of the paper color is added to the color information that was corrected in step 112. Thus, new color information, that is, color information for which a paper color simulation has been implemented, can be generated.

Herein, if a spot color and a paper color are both inputted as CMYK values, CMYK color correction can be executed after step 104 of the above-described FIG. 6.

Thus, accurate color reproduction is possible even when paper colors and spot colors are inputted as CMYK values rather than being registered in advance.

Further, when a paper color simulation is to be implemented, if any of the process colors is not to be printed out, the paper color simulation may be performed by applying a color substitution to this process color.

At such a time, a paper color table in which CMYK values are fixed regardless of density is created. For example, if the CMYK values of Paper Color A are C=10, M=40, Y=0, and K=2, the table shown in Table 3 will be created.

TABLE 3

| | Paper Color A | | | |
| Density | C | M | Y | K |
| --- | --- | --- | --- | --- |
| 0 | 10 | 40 | 0 | 2 |
| 1 | 10 | 40 | 0 | 2 |
| 2 | 10 | 40 | 0 | 2 |
| . | . | . | . | . |
| . | . | . | . | . |
| 255 | 10 | 40 | 0 | 2 |

That is, a table in which the CMYK values are constant regardless of density is created.

When such a table of a paper color (for example, Paper Color A) is employed, it is ascertained whether or not there is a process color for which output is not assigned. For a process color for which output is not assigned, substitution of that color with the paper color is specified. In other words, an N-color printing simulation in which the paper color serves as one spot color may be carried out.

Now, in the above descriptions, a color substitution is implemented by using a paper color and a spot color to prepare a new spot color table, or a color substitution is implemented with a paper color serving as a spot color. However, paper color simulations are not limited thus.

For example, if the print server 12 is equipped with a spot color-overprinting function, it is possible to perform a paper color simulation by employing this overprinting function.

FIG. 8 shows an example of a paper color simulation that utilizes an overprinting function.

In this flowchart, in a first step 120, a job transmitted from the client terminals 14 is received. When this job is received, first, in step 122, a first page of drawing data or image data is read in, and drawing processing is carried out on this page (step 124). If, at this time, printing functions such as color substitution, N-color printing simulation and the like are specified, the processing is carried out on the basis of such specifications.

Thereafter, in step 126, it is ascertained whether the drawing processing of the first page has finished. When this judgement is positive, the process advances to step 128 and it is ascertained whether or not a paper color has been specified.

Here, if there is a paper color setting, the judgement of step 128 is positive and the process advances to step 130. In step 130, a name of the paper color (a spot color name) is acquired and, in step 132, overprinting processing is applied to the whole area of the page in accordance with this spot color name.

Now, an example in which the name of the paper color acquired in step 130 is "C10M40Y0K2" will be illustrated.

```
true setoverprint                          % Sets overprinting
     [/Separation(=C10M40Y0K2)/DeviceGray[]] setcolorspace    % Sets to spot
color of paper color
     initclip clippath fill                %Draws over whole area
```

When such drawing instructions are carried out in step 132, overprinting of the paper color over the whole area of the page is implemented.

This spot color name is converted to CMYK values stored in the HDD 28 and overprinting with the CMYK values of the paper color is performed by the spot color-overprinting function of the print server 12.

That is, the CMYK values of the paper color are added over the whole area of the page, and the paper color fills the whole page. Then, in step 134, it is ascertained whether or not processing of all pages has been completed. In other words, the paper color is overprinted on all pages specified by the paper color simulation.

Thus, it is possible to perform paper color simulations with ease by use of this process as well.

Now, for the present embodiment as described above, the print server 12 has been described an example. However, the present invention is not limited to the print server 12, and can be applied to image processing devices provided at print servers with arbitrary structures. Furthermore, the present invention is not limited to print servers, and can be applied to image processing devices with arbitrary structures which perform image processing on the basis of image data and/or drawing instructions created by the client terminal 14.

Such an image processing device in which the present invention is applied may be a device which includes: a storage component for storing color information of a paper color; and a generation component which, when addition of a paper color over the whole area of a page layout is instructed, adds the color information of the paper color to color information that is based on image data and/or drawing instructions, to generate new color information.

Further, in such an image processing device, a substitution component which, when a color substitution is instructed for any of process colors, performs a color conversion by adding color information of the paper color to a substitution color may be provided to serve as the generation component. Further still, the generation component may include a substitution-setting component which, when there is a process color for which non-printing is specified, performs a color substitution in which the paper color serves as a substitution color for that process color.

Further yet, the image processing device may include an input component which stores color information, which is inputted to serve as a paper color, in the storage component. Furthermore, such an input component may include a color conversion component which, if the color information of the paper color has been inputted as L*a*b* values, converts these values to CMYK values. Consequently, it is possible to carry out input of a paper color using a densitometer or the like with ease.

What is claimed is:

1. An image processing method that performs image processing, based on at least one of image data and drawing instructions, on a page layout which employs process colors inputted from an image processing terminal, the image processing method comprising:

(a) specifying a color substitution of at least one of the process colors;
   (b) instructing addition of a paper color, including color information, to a whole area of the page layout; and
   (c) adding the color information of the paper color to color information of a substitution color which is being substituted for the process color specified by the color substitution.

2. The image processing method of claim 1, wherein, at (c), a table, in which CMYK values of the paper color are added to CMYK values of the substitution color, is employed.

3. An image processing method that performs image processing, based on at least one of image data and drawing instructions, on a page layout which employs process colors inputted from an image processing terminal, the image processing method comprising:

(a) specifying non-printing of at least one of the process colors;
   (b) instructing addition of a paper color, including color information, to a whole area of the page layout; and
   (c) performing a color substitution of the paper color for the process color for which non-printing has been specified and drawing with the paper color.

4. An image processing method that performs image processing, based on at least one of image data and drawing instructions, on a page layout which employs process colors inputted from an image processing terminal, the image processing method comprising:

(a) instructing addition of a paper color, including color information, to a whole area of the page layout; and
   (b) drawing the paper color over the whole area of the page layout by overprinting of a spot color based on the color information.

5. An image processing device that performs image processing, based on at least one of image data and drawing instructions, on a page layout which employs process colors inputted from an image processing terminal, the image processing device comprising:

a specification component which specifies a color substitution of at least one of the process colors;
   an instruction component which instructs addition of a paper color, including color information, to a whole area of the page layout; and
   a color substitution component which adds the color information of the paper color to color information of a substitution color which is being substituted for the process color specified by the color substitution.

6. The image processing device of claim 5, wherein, at the color substitution component, a table, in which CMYK values of the paper color are added to CMYK values of the substitution color, is employed.

7. An image processing device that performs image processing, based on at least one of image data and drawing instructions, on a page layout which employs process colors inputted from an image processing terminal, the image processing device comprising:

a specification component which specifies non-printing of at least one of the process colors;

an instruction component which instructs addition of a paper color, including color information, to a whole area of the page layout; and a drawing component which performs a color substitution of the paper color for the process color for which non-printing has been specified and draws with the paper color.

8. An image processing device that performs image processing, based on at least one of image data and drawing instructions, on a page layout which employs process colors inputted from an image processing terminal, the image processing device comprising:

an instruction component which instructs addition of a paper color, including color information, to a whole area of the page layout; and a drawing component which draws the paper color over the whole area of the page layout by overprinting of a spot color based on the color information.

* * * * *